United States Patent [19]

Tutiya et al.

[11] 4,223,527

[45] Sep. 23, 1980

[54] RETAINING SPRING FOR A WRISTWATCH CASE

[75] Inventors: Hidetaka Tutiya, Akishima; Masahiko Waki, Tokorozawa, both of Japan

[73] Assignee: Citizen Watch Co., Ltd., Tokyo, Japan

[21] Appl. No.: 950,775

[22] Filed: Oct. 12, 1978

[30] Foreign Application Priority Data

Oct. 13, 1977 [JP] Japan ........................ 52-122743

[51] Int. Cl.$^{3}$ ........................ G04B 37/04; F16B 7/20; F16B 13/00

[52] U.S. Cl. ........................ 368/283; 403/297; 403/295; 368/286; 368/276

[58] Field of Search ........................ 58/88 R, 53, 102, 101, 58/23 BA, 90 R; 403/295, 297, 361, 292; 285/423

[56] References Cited

U.S. PATENT DOCUMENTS 2,845,773 8/1958 Sakalys ........................ 58/90

*Primary Examiner*—J. V. Truhe
*Assistant Examiner*—John B. Conklin
*Attorney, Agent, or Firm*—Jordan and Hamburg

[57] ABSTRACT

A retaining spring for fixedly retaining a case band and a back cover of a wristwatch case, which retaining spring comprises a fixing portion secured to one of the case band and the back cover, a weakened or torsionable portion extending from the fixing portion, and an engaging portion connected to the fixing portion through the weakened or torsionable portion and engaging with the other one of said case band and said back cover.

12 Claims, 15 Drawing Figures

PRIOR ART

Fig. 4
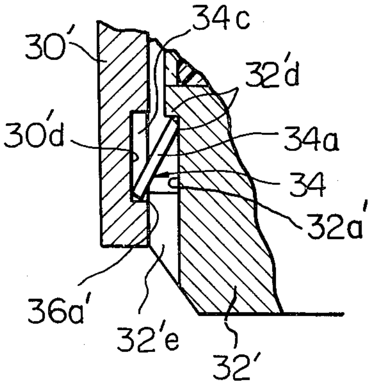
Fig. 5A
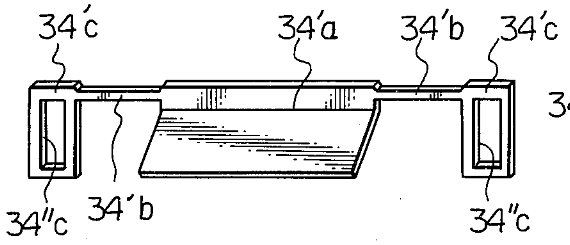
Fig. 5B
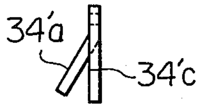
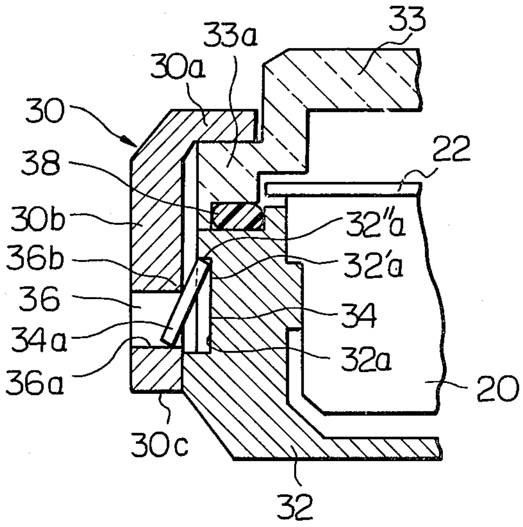
Fig. 2

RETAINING SPRING FOR A WRISTWATCH CASE

The present invention relates to wristwatch cases and, more particularly, to a retaining spring inserted between the inner and outer periphery portions of a wristwatch case for the purpose of securing the same.

In a wristwatch case composed of a case band and a back cover it is conventional practice to secure the inner and outer peripheral portions of the case band and back cover by means of a retaining spring. In this expedient, a retaining hole is provided in the cylindrical wall portion of the case band, and the back cover is provided with a retaining spring fitting portion which faces the retaining hole of the case band. A retaining spring is attached to the fitting portion of the back cover by means of soldering or the like and secures the case band to the back cover by engaging with the retaining hole of the case band. The retaining spring, although it flexes inwardly when the case band is assembled or disassembled, is designed so as not to be deformed by a weak external force, thus strengthening the retaining force of the spring. The spring therefore will not undergo deformation unless a fairly strong external force is applied, a disadvantage which makes assembly and disassembly difficult. Another defect is that the retaining spring becomes detached from the case band since the soldered portion of the spring is adversely affected by its deformation that accompanies assembly and disassembly.

It is, therefore, an object of the present invention to provide a wristwatch case which is simple in construction and easy to assemble.

It is another object of the present invention to provide a wristwatch case including a retaining spring having a simple structure that readily flexes to facilitate assembly and disassembly of a wristwatch case without causing loosening of the case.

In the accompanying drawings, in which:

FIG. 2 is a cross sectional view of a preferred embodiment of a wristwatch case according to the present invention;

FIG. 4 is a cross-sectional view of a modification of the watch case shown in FIG. 2;

FIG. 5A is a perspective view of a modification of the retaining spring shown in FIGS. 3A and 3B;

FIG. 5B is a side view of the retaining spring shown in FIG. 5A;

Figure 1A:
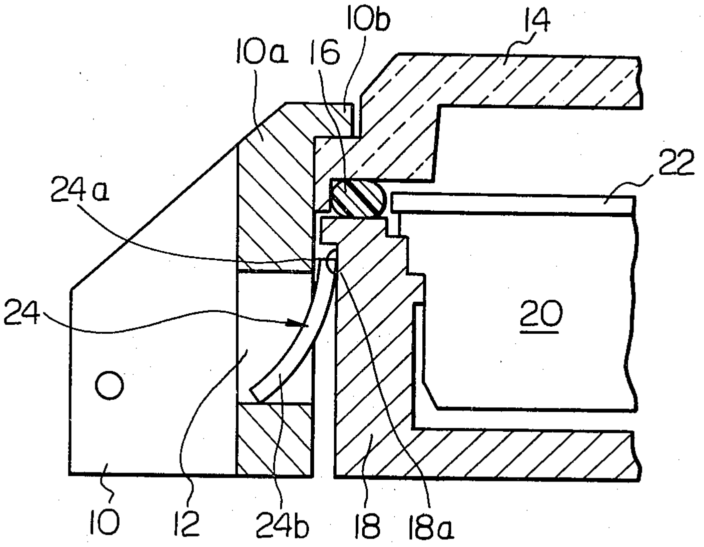
Fig. 1A PRIOR ART
FIG. 1A is a cross-sectional view of a timepiece case incorporating a prior art retaining spring.
Figure 1B:
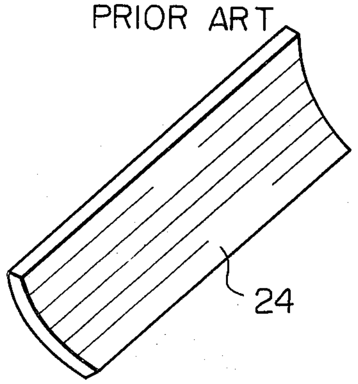
Fig. 1B PRIOR ART
FIG. 1B is a perspective view of the retaining spring shown in FIG. 1A.

Referring now to FIGS. 1A and 1B, there is shown a conventional wristwatch case. In FIG. 1A, the wristwatch case comprises a case band 10 having a cylindrical wall portion 10*a* formed with a radially extending retaining hole 12. The case band 10 also has a radially inwardly extending flange portion 10*b*, by which a watch glass 14 is held in a fixed place. A sealing ring 16 is compressed between the watch glass 14 and a back cover 18 to provide a water-proof sealing effect therebetween. Reference numeral 20 denotes a watch movement and 22 a time dial. With the arrangement mentioned above, the retaining spring 24 has its upper portion 24*a* secured to an outer periphery 18*a* of the back cover 18 by solderring or other suitable means and a lower portion 24*b* inserted in the retaining hole 12 of the case band 12. Thus, the back cover 18 is retained by the spring 24 cooperating with the case band 10. As previously described, the retaining spring 24 is designed so as not to be deformed by a weak external force, thus strengthening the retaining force of the spring. The spring therefore will not undergo deformation unless a fairly strong external force is applied, a disadvantage which makes assembly and disassembly difficult. Another defect is that the retaining spring 24 becomes detached from the case band since the soldered portion of the spring is adversely affected by its deformation that accompanies assembly and disassembly.

FIG. 2 shows a preferred embodiment of a wristwatch case according to the present invention which overcomes the shortcomings encountered in prior art. The wristwatch case generally comprises an outer case or a case band 30, an inner case or a back cover 32 and a watch glass 33 held in place by the case band 30 and the back cover 32. The back cover 32 is fixedly secured to the case band 30 by a retaining spring 34.

Figure 3A:
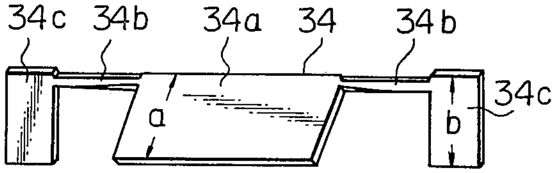
FIG. 3A is a perspective view of the retaining spring shown in FIG. 2.
Figure 3B:
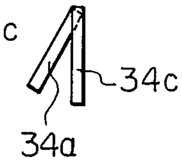
FIG. 3B is a side view of the spring shown in FIG. 3A.

As shown in FIGS. 3A and 3B, the retaining spring 34 comprises an engaging or movable portion 34*a*, weakened or torsionable portions 34*b* serving as springs and extending from both ends of the engaging portion 34*a*, and fixing or stationary portions 34*c* connected to the engaging portion 34*a* through the torsionable portions 34*b*. The torsionable portions 34*b* are twisted in a normal state such that the engaging portion 34*a* is angled relative to the fixing portions 34*c* as seen in FIG. 3B.

Turning now to FIG. 2, the case band 30 has a radially inwardly extending flange portion 30*a* engaging with a flange 33*a* of the watch glass 33, and wall portion 30*b* having its lower end portion formed with a retaining groove 36 for retaining a portion of the retaining spring 34. The retaining groove 36 defines an abutting portion 36*a* engaging with the engaging portion 34*a* of the retaining spring 34, and a stop portion 36*b* for restricting the excessive movement of the engaging portion 34*a* of the retaining spring 34. The back cover 32 has at its outer periphery a holding recess 32*a* facing the retaining groove 36 of the case band 30. Retaining spring 34 is fixedly mounted at its fixing portions 34*c* in the holding recess 32*a* of the back cover 32 by spot welding, etc. A sealing ring 38 is interposed between the watch glass 33 and the back cover 32. The engaging portion 34*a* of the retaining spring 34 is inserted in the retaining groove 36 and engages with the abutting portion 36*a*.

During assembly, sealing ring 38 is placed on the upper surface of the back cover 32, watchglass 33 is placed on the sealing ring 38, and case band 30 is then positioned on the watch glass flange 33*a*. When the case band 30 is moved downward, the end face 30*c* of the case band 30 abuts the inclined surface of the retaining spring engaging portion 34*a* projecting obliquely downward from the holding recess 32*a* of the back cover 32. When the edge of groove 36 passes beyond the edge of engaging portion 34*a*, the torsional deformation of torsionable portions 34*b* is restored so that the engaging portion 34*a* enters retaining groove 36 and is positioned by the stop portion 36*b*. The case band 30 and the back cover 32 are thus secured to each other. Axial movements of the case band and the back cover relative to each other is limited by the engaging portion 34*a* engaging with the retaining groove 36. To remove the case band 30 from back cover 32 a tweezer or the like is inserted through the groove 36 from the outside and is used to lightly press engaging portion 34*a* radially inward to dislodge it from abutting portion 36*a*, with the restoring force of sealing ring 38 serving to facilitate the disassembly operation.

Since the torsionable portion of the retaining spring does not contribute toward securing the case band and the back over during either assembly or disassembly, even a very weak retaining spring can be employed and the application of a strong force is unnecessary to achieve the placement or dislodging of the engaging portion of the retaining spring. The watch case therefore will not be scratched as is often the case when the hand of the operator slips while applying excessive force to a pair of tweezers or the like, and the thumb or finger nail of the operator will not be injured by using the nail to manipulate the retaining spring in order to disassemble the case. These advantages facilitate the disassembly operation.

In the present embodiment the fixing portions of the retaining spring may be welded in order to reduce the labor for assembly and disassembly. In such a case the fixing portions need be welded at only one point. If welding is not employed, the b dimension of fixing portion 34*c* should be made equal to or longer than the a dimension of the engaging portion 34*a*. If this is done, at the time of assembly the retaining spring is fit into the holding recess of the back cover before the case band is attached, and the assembly can then proceed as before without the retaining spring projecting out from the holding recess. This eliminates the problems experienced in the prior art, such as bending of the spring due to the application of excessive force, as well as the attendant damage or stripping off of the welded portion. In accordance with the preferred embodiment mentioned above, the welded portion will not come off, even if the weld lacks great strength, since the fixing portions of the retaining spring is not subjected to a strong force. No damage will result in terms of utilization even if the welded portion should happen to be stripped off.

FIG. 4 shows a modification of the wristwatch case shown in FIG. 2. In FIG. 4, case band 30' is provided with a fitting or holding recess 30'*d*, while back cover 32' is formed with an abutting portion 32'*d* and a groove 32'*e* that permits the insertion of the tweezer or the like for the purpose of removing retaining spring 34 from abutting portion 32'*d* at the time of disassembly. The fixing portions 34*c* are secured to the bottom wall of the holding recess 30'*d* by spot welding or other suitable means, while the engaging portion 34*a* obliquely extends between the corner of the recess 30'*d* and the abutting portion 32'*d*.

FIG. 5A shows a modification of the retaining spring shown in FIGS. 3A and 3B, and FIG. 5B shows a side view of the same. Although the torsionable portions 34*b* were twisted in the example of FIGS. 3A and 3B, the engaging portion 34'*a* is bent in the present modification such that the engaging portion 34'*a* is angled relative to the fixing portions 34'*c*, and the twisted portion is not adopted. The fixing portions 34'*c* have bores 34''*c*, by which each of the fixing portions 34'*c* provides resiliency so that the fixing portions are resiliently disposed in corresponding holding recess formed in the case band or back cover. The method of use and effects are exactly as described with respect to the embodiment shown in FIG. 2.

Figure 6:
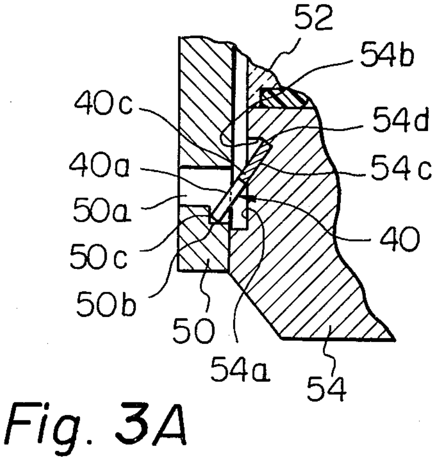
FIG. 6 is a fragmentary cross sectional view of another preferred embodiment of a wristwatch case according to the present invention.

FIG. 6 is a fragmentary cross sectional view of another preferred embodiment of a wristwatch case according to the present invention. In FIG. 6, the wristwatch case comprises in general a case band 50, a watch glass 52 and a back cover 54. The case band 50 has a retaining groove 50*a* extending toward the back cover 54, an abutting or engaging portion 50*b* and a stop portion 50*c*. The back cover 54 has an axially extending recess 54*a*, and an indented portion 54*b* having an inclined surface 54*c* and an engaging wall 54*d*. The case band 50 and the back cover 54 are fixedly retained relative to each other by a retaining spring 40.

Figure 7A:
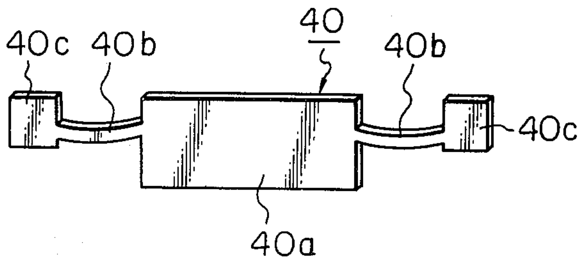
FIG. 7A is a perspective view of a retaining spring used in the watch case of FIG. 6.
Figure 7B:
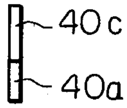
FIG. 7B is a side view of the retaining spring of FIG. 7A.

As best shown in FIGS. 7A and 7B, the retaining spring 40 comprises an engaging portion 40*a*, torsionable portions 40*b* extending from both ends of the engaging portion 40*a*, and fixing portions 40*c* connected to the engaging portion 40*a* through the torsionable portions 40*b*. The torsionable portions 40*b* are curved in a vertical direction to provide an improved torsionable effect and spring action.

Turning now to FIG. 6, the fixing portions 40*c* are secured to the inclined surface 54*c* of the indented portion 54*b* and the engaging portion 40*a* engages with the abutting portion 50*b* and the stop portion 50*c* of the case band 50, thereby fixedly retaining the case band and the back cover relative to each other. During disassembly, the engaging portion 40*a* is pushed rightward as viewed in FIG. 6 until the engaging portion 40*a* is disengaged from the case band and thereafter the back cover 54 is removed from the case band.

Figure 8:
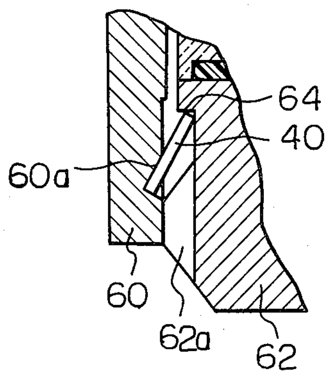
FIG. 8 is a cross-sectional view of a modification of the watch case shown in FIG. 6.

FIG. 8 illustrates a modification of the watch case shown in FIG. 6. A case band 60 is provided with an indented portion 60*a*, while back cover 62 is formed with an abutting portion 64 and a groove 62*a* that permits the insertion of a screw driver or the like for the purpose of dislodging the retaining spring 40 from the abutting portion 64 at the time of disassembly. The fixing portions 40*c* of the retaining spring 40 are fitted into and secured to the indented portion 60*a* of the case band 60. The effects are as already described with the addition of a better appearance owing to the fact that the retaining spring cannot be seen from the side of the case.

Figure 9:
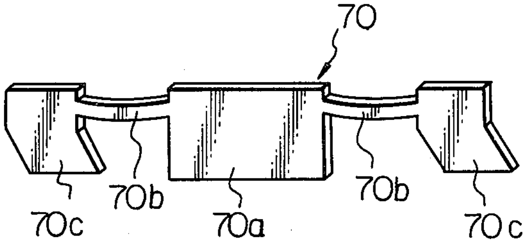
FIG. 9 is a perspective view of a modification of the retaining spring shown in FIGS. 7A and 7B.

FIG. 9 illustrates a modification of the retaining spring shown in FIGS. 7A and 7B. The retaining spring 70 has an engaging portion 70*a*, torsionable portions 70*b*, and fixing portions 70*c* which are bent in the same direction. The fixing portions 70*c* and the engaging portion 70*a* as well as torsionable portions 70*b* are connected and lie in the same plane. This retaining spring is used in the same manner as that of the embodiment shown in FIG. 6. However, the spring may be used as in the 1st embodiment if the engaging portion is utilized as the fixing portion and the left and right fixing portions as engaging portions.

Figure 10:
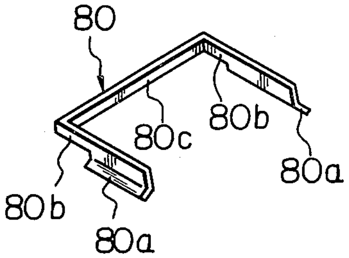
FIG. 10 is a perspective view of another preferred example of a retaining spring according to the present invention.
Figure 11:
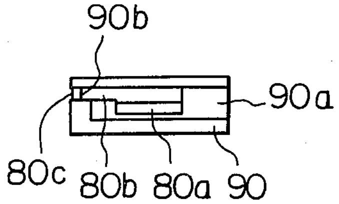
FIG. 11 is a view helpful for describing the retaining spring shown in FIG. 10 as it is accommodated in the back cover.

FIG. 10 illustrates another preferred example of a retaining spring for use in a watch case according to the present invention. A retaining spring 80 is substantially U-shaped and comprises engaging portions 80*a*, spring or torsionable portions 80*b* and fixing portion 80*c* connected to the engaging portions 80*a* through the torsionable portions 80*b*. As shown in FIG. 11, a fitting groove 90*a* is provided in one side surface of an outer periphery of a back cover 90, and a retaining recess 90*b* for accommodating fixing portion 80*c* of the retaining spring 80 is provided in another side surface of the back cover 90. In use the retaining spring 80 is fitted into the back cover 90. The retaining spring 80 is thus initially disposed in the fitting groove 90*a* of the back cover and thereafter the back cover is inserted in the case band in a manner as previously noted above with reference to FIG. 2. Since the two engaging portions 80*a* are provided, the spring can be inserted into the fitting groove of the back cover in just one, time-saving operation. All other effects are identical to those obtained in the 1st embodiment.

In accordance with the invention as described above, a weakened spring or torsionable portion is disposed in a portion of a wristwatch case that is not related to the strength of the portion that secures the case band, the back cover and other watchcase related components. This eliminates the need for special tools and considerable force when assembling or disassembling the watchcase and also simplifies the assembly and disassembly operation. The retaining spring itself is also easily fabricated and worked.

What is claimed is:

1. A wristwatch case comprising:
- a case band;
- a back cover disposed in said case band;
- a watch glass held in place by said case band and said back cover; and
- a retaining spring disposed between said case band and said back cover for fixedly retaining said case band an said back cover relative to each other;
- said retaining spring comprising an engaging portion engaging with both of said case band and said back cover to fixedly retain said case band and said back cover relative to one another, first and second torsionable portions horizontally extending from both ends of said engaging portion and first and second fixing portions integrally connected to said first and second torsionable portions, respectively; said first and second fixing portions being fixedly retained in one of said case band and said back cover, said first and second torsionable portions including weakened portions serving as springs, respectively, and said first and second fixing portions being aligned on the same horizontal plane as said engaging portion, to allow rotation of said engaging portion at a predetermined angle relative to the plane of each of said first and second fixing portions, whereby said engaging portion is movable to a position to allow removal of said case band and said back cover relative to each other.

2. A wristwatch case according to claim 1, in which said engaging portion is angled relative to said fixing portions.

3. A wristwatch case according to claim 1, in which said first and second torsionable portions are twisted such that said engaging portion is angled relative to said fixing portions.

4. A wristwatch case according to claim 2, in which said first and second fixing portions have bores formed therein, respectively.

5. A wristwatch case according to claim 1 or 2, in which said case band comprises an axially extending wall portion formed with a retaining groove defining an abutting portion and a stop portion, and said back cover has a holding recess having a bottom wall facing to said retaining groove, and in which said first and second fixing portions of said retaining spring are secured to said bottom wall of said holding recess, respectively, and said engaging portion of said retaining spring has an upper portion engaging with said bottom wall of said holding recess, an intermediate portion engaging with said stop portion of said retaining groove and a lower portion engaging with said abutting portion of said retaining groove.

6. A wristwatch case according to claim 1 or 2, in which said case band has a holding recess having a bottom wall, and said back cover has a groove defining an abutting portion and a wall portion facing to said holding recess, and in which said first and second fixing portions of said retaining spring are secured to said holding recess, respectively, and said engaging portion of said retaining spring has an upper portion engaging with said bottom wall of said holding recess and lower portion engaging with said abutting portion of said groove.

7. A wristwatch case according to claim 1, in which said engaging portion and said first and second torsionable portions as well as said first and second fixing portions lie in the same plane.

8. A wristwatch case according to claim 1, in which said first and second torsionable portion are curved in a vertical direction, respectively.

9. A wristwatch case according to claim 1 or 7, in which said case band has a retaining groove defining an abutting portion and a stop portion, and said back cover has an axially extending recess defining an indented portion having an inclined surface, and in which said first and second fixing portions are secured to said inclined surface, respectively, and said engaging portion of said retaining spring obliquely extends toward said abutting portion and said stop portion and engages therewith.

10. A wristwatch case according to claim 1 or 7, in which said case band has an indented portion having an inclined surface, and said back cover has a groove defining an abutting portion, and in which said first and second fixing portions of said retaining spring are secured to said inclined surface of indented portion, respectively, and said engaging portion of said retaining spring obliquely extends from said indented portion of said case band toward said abutting portion of said back cover and engages therewith.

11. A wristwatch case according to claim 1, in which said first and second fixing portions of said retaining spring have bent portion, respectively.

12. A retaining spring for fixedly retaining a case band and back cover having a fitting groove and a retaining recess with respect to each other, comprising:

a fixing portion secured to said retaining recess of said back cover;

first and second torsionable portions horizontally extending from both ends of said fixing portion; and first and second engaging portions integrally connected to said first and second torsionable portions, respectively;

said fixing portion being fixedly retained in said back cover, said first and second torsionable portions including weakened portions serving as springs, respectively, and said fixing portion being aligned on the same horizontal plane as said engaging portions, to allow rotation of said engaging portion at a predetermined angle relative to the plane of said fixing portion, whereby said engaging portion is movable to a position to allow removal of said case band and said back cover relative to each other.

* * * * *